United States Patent [19]

Loose

[11] Patent Number: 4,576,782
[45] Date of Patent: Mar. 18, 1986

[54] NUCLEAR REACTOR LOSS OF COOLANT PROTECTION SYSTEM

[75] Inventor: Robert A. Loose, Murrysville, Pa.

[73] Assignee: Westinghouse Electric Corp., Pittsburgh, Pa.

[21] Appl. No.: 543,599

[22] Filed: Oct. 19, 1983

[51] Int. Cl.⁴ ............................................. G21C 13/10
[52] U.S. Cl. ................................. 376/282; 376/284; 376/293
[58] Field of Search ............... 376/282, 292, 293, 298, 376/299, 283

[56] References Cited

U.S. PATENT DOCUMENTS

| | | | |
|---|---|---|---|
| 3,115,450 | 12/1963 | Schanz | 376/283 |
| 3,438,857 | 4/1969 | Sulzer | 376/283 |
| 3,649,451 | 3/1972 | Yedidia et al. | 376/282 |
| 3,702,281 | 11/1972 | Brits et al. | 376/282 |
| 3,718,539 | 2/1973 | West et al. | 376/283 |
| 3,859,166 | 1/1975 | Flynn et al. | 376/282 |
| 4,080,256 | 3/1978 | Braun et al. | 376/282 |
| 4,092,490 | 5/1978 | Schabert et al. | 376/293 |
| 4,280,871 | 7/1981 | Hoffmann | 376/292 |

FOREIGN PATENT DOCUMENTS 2429478 1/1980 France ................................. 376/298

Primary Examiner—Deborah L. Kyle
Assistant Examiner—Richard W. Wendtland
Attorney, Agent, or Firm—Daniel C. Abeles

[57] ABSTRACT

A pressurized water reactor system having circulation means outside the containment vessel for the circulation of loss of coolant emergency water is provided which prevents exposure of such water to the atmosphere. The system includes an enclosure, separate from the containment vessel, the interior of the enclosure being sealed to the atmosphere and containing a pumping means, and encased inlet and outlet conduits communicating between the interior of the containment vessel and the pump means within the enclosure. The enclosure may also contain a heat exchange means, while the emergency water storage tank can be positioned in the containment vessel, in the enclosure, or separate from both. Provision is also made for use of the pump in the enclosure for circulation of residual heat removal coolant water.

15 Claims, 7 Drawing Figures

NUCLEAR REACTOR LOSS OF COOLANT PROTECTION SYSTEM

BACKGROUND OF THE INVENTION

This invention is directed to a system for protecting the environment in the event of a loss-of-coolant accident in a pressurized water reactor which contains pumping and circulation equipment for radioactive primary cooling water outside the containment vessel for the reactor system.

Many systems have been devised for use in injection of coolant fluid into a nuclear reactor vessel in the event of a loss of coolant accident. Generally, the systems have means for sensing any break in the primary coolant system and pumps and valves to inject emergency cooling water into the reactor vessel to cool the nuclear core. The emergency cooling water, after contact with the core is to be collected, recirculated while cooled by a heat exchanger, and recycled for further cooling of the core, until the shutdown is effected.

Examples of emergency cooling systems for nuclear power plants are provided in the following patents. U.S. Pat. No. 3,649,451 teaches a containment system wherein a first quantity of coolant fluid such as borated water is used to fill a dry well containing the reactor vessel, to a level beneath the vessel, and a second quantity of coolant fluid from a loss of coolant source in the primary cooling loop is used to fill the well to a level sufficient to protect the core. U.S. Pat No. 3,702,281 shows a reactor system where the emergency water source is also a shield for the reactor and pumps for circulating emergency coolant water are provided outside the containment vessel. In U.S. Pat. No. 3,718,539, the containment vessel for the reactor is completely contained within an outer containment shielding structure which also contains a vapor suppression pool for condensing vapors released from the plant. Various core cooling apparatus are integrated into the system. In U.S. Pat. No. 3,859,166, a combined coolant storage tank and sump is located within the containment vessel, while pumping means for various cooling systems for the reactor are located outside the containment vessel.

The emergency cooling systems thus generally include a tank or other container for a supply of emergency cooling water, which tank can be located either inside the containment vessel or outside the same. Also, the heat exchange units for cooling of the recirculated emergency cooling water can be located either inside or outside the containment vessel. It is preferred, however, that the pumping means, a plurality of which are separately provided for assurance of operability, for use with the emergency coolant recirculation system be positioned outside the containment vessel so the routine checks and maintenance can be carried out on the pumping equipment in an environment separate from that of the containment vessel.

With pumping means located outside the containment vessel, potentially highly radioactive fluid would need to be recirculated in piping outside the containment vessel, in the event of a loss of coolant accident. If such piping, outside the containment vessel should break, radioactive fluid would be discharged to the environment. The fluid could flood equipment and instruments, and prevent access to an auxiliary building. While placement of pumps inside the containment vessel has been proposed, and has been used to a limited extent, to avoid any possible contamination due to pipe breaks outside the containment vessel, this arrangement does not provide any access to the pumps following any loss of coolant accident, and only limited access during normal plant operation.

It is an object of the present invention to provide a system for use in a loss of coolant accident, where the pumps for circulation of emergency coolant are located outside the containment vessel, while the conduits and pump through which the fluid is circulated could fail without contamination of the environment.

SUMMARY OF THE INVENTION

An improved emergency coolant recirculation system for a pressurized water reactor, for use in the event of a loss of coolant accident, where the pumps for circulation of the emergency coolant water are located outside the containment vessel for the reactor, has an enclosure adjacent to and outside the containment vessel which contains the pump and conduits. The interior of the enclosure is sealed to the environment, with inlet and outlet conduits between the enclosure and the containment vessel encased within outer casings, and the pump means is completely contained within the enclosure such that if inlet or outlet conduits or a pump fails, any coolant leaking therefrom will be collected in the enclosure and sealed to the atmosphere. The emergency water storage tank may be located in the containment vessel, in the enclosure, or outside both, while the heat exchange means for the recirculated emergency coolant may be located either inside the containment vessel or inside the enclosure.

BRIEF DESCRIPTION OF THE DRAWINGS

For a better understanding of the present invention, reference may be made to the accompanying drawings, wherein.

DETAILED DESCRIPTION OF THE EMBODIMENT

The present invention provides for the placement of pumps for the circulation of coolant, in the event of a loss of coolant situation in the primary coolant system of a pressure water reactor, outside the containment vessel and within an enclosure that is sealed to the atmosphere. Such placement, with all conduits and the pump means in a separate enclosure, avoids the possibility of exposure of contaminated water from the enclosure to the atmosphere and contains all such water within a localized, sealed area. Normally, a plurality of such pumps and recirculation systems are provided for a reactor system so as to assure a dependable source of coolant.

Figure 1:
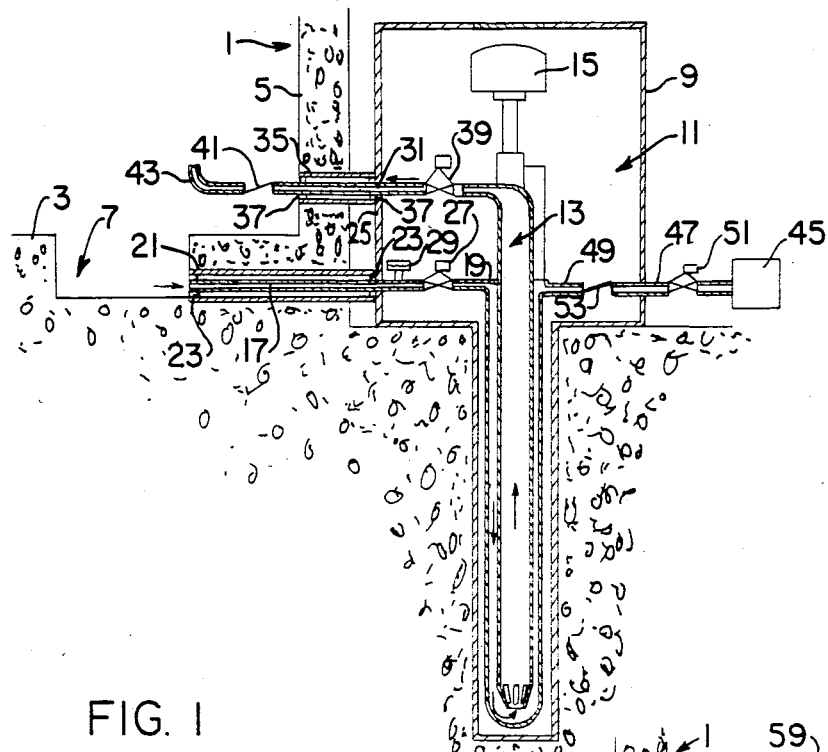
FIG. 1 is a schematic view, partially in section which shows the enclosure, containing the pumping means for emergency coolant recirculation, adjacent a wall of a containment vessel, and the emergency water storage tank outside both the containment vessel and the enclosure.

Referring now to the drawings, FIG. 1 illustrates one embodiment of the present invention wherein the conduits and pumping means for the coolant are located in a metallic tank, adjacent the wall of the containment vessel in the region of a sump area within the containment vessel. The containment vessel 1, contains the usual components of a pressure water reactor system, such as the reactor vessel, primary coolant loops, steam generator, secondary steam and water loops, and portions of emergency cool-down systems, such as a high pressure cooling system, low pressure cooling system, spray cooling system, and the like, all of which are of conventional design and not shown.

The containment vessel 1 has a base 3 and walls 5, with a sump 7 provided in the base 3 to collect flooding water following a loss of coolant incident or other emergency shutdown, where the reactor core is flooded with water. Positioned adjacent to the wall 5 of the containment vessel 1, and exterior of the vessel, is an enclosure 9 which is formed of a material such as a metallic material that will shield the interior 11 thereof from the atmosphere. A pump 13, such as a vertical pump, as shown, or a horizontal pump, is supported completely within the enclosure 9, together with a motor 15 for activation of the pump. If desired, the motor 15 need not be located within the enclosure but may be on the outside thereof, provided adequate seals are provided to seal the wall of enclosure between the motor and the pump.

An inlet conduit 17 communicates between the sump 7 in the containment vessel and the inlet 19 of the pump 13. The inlet conduit 17 is surrounded by a shielding conduit, or outer casing, 21 on passage through the wall 5 of the containment vessel and flanges 23, such as bellows, are provided which seal the area between the inlet conduit 17 and shielding conduit 21 at both the wall 5 of the containment vessel and the wall 25 of the enclosure 9. A valve 27 and a rupture disc 29 are located in inlet conduit 17 within the enclosure 9. An exhaust conduit 31, which communicates between the outlet 33 of the pump 13 and the interior of the containment vessel 1, is also surrounded by a shielding conduit, or outer casing, 35 on passage through the wall 5 of the containment vessel, and flanges 37 seal the area between the exhaust conduit 31 and the shielding conduit 35 at both the wall 5 of the containment vessel and the wall 25 of the enclosure 9. A valve 39 is located in the exhaust conduit 31 within the enclosure 9. The exhaust conduit 31, at a location within the containment vessel 1, contains a check valve 41 and discharges into a line 43 which is connected to the reactor cooling system within the containment vessel 1. In the embodiment of FIG. 1, a storage tank 45, outside the containment vessel 1 and the enclosure 9, provides a source of refueling or emergency coolant water, with conduit 47 passing through the wall 25 of the enclosure and communicating with a further inlet 49 of the pump 13, the conduit 47 containing a valve 51 and a check valve 53.

In the event of a loss of primary coolant for the reactor core, the recirculation system will be activated. Initially, the emergency cooling water from the source 45 will be directed through the pump 13 and into the containment vessel 1 through exhaust conduit 31. The coolant water will be used in the various cooling apparatus in the enclosure 1 to flood the reactor. The flooding coolant, now hot, will collect in the sump 7 and must be cooled and recycled. The water collected in sump 7 will be directed through inlet conduit 17 by valve 27 and into the pump 13 from which it is then pumped through valve 39 and exhaust conduit 31, back to the containment vessel 1. A heat exchanger (not shown) in the containment vessel 1 will be used to cool the recirculated water and direct it for re-use in flooding of the reactor. In the event that either the inlet conduit 17 or the exhaust conduit 31 should break, between the interior of the containment vessel 1 and the interior of the enclosure 9, the outer casings, 21 and 35 respectively will contain the water and recirculation will not be affected. If the inlet conduit 17 should fail within the enclosure 9, on the suction side of the pump 13, the enclosure will merely fill with water, which will then be at the same pressure as the containment vessel, which would be about 40 to 60 pounds per square inch, and circulation of the water through the pump will still continue, while the environment outside the enclosure is protected. In the event that the exhaust conduit 31 should fail at a location inside the enclosure 9, the tank will fill with water and the pressure increased, due to the pumping action, to a pressure which will cause rupture of the rupture disc 29. Upon breaking of the rupture disc 29, the coolant in the enclosure will discharge back into the inlet conduit 17 within the enclosure and a closed recirculating loop of coolant effected in the enclosure until the pump is stopped. Generally, a rupture disc that would fail at pressures of about 100–150 pounds per square inch would be preferred. Upon stopping of the pump, another pump of the plurality of pumps will be used to recirculate the coolant, and the coolant fluid in the enclosure 9 from the failed conduit will be sealed from the environment.

In each instance, failure of the inlet conduit 17 or the outlet conduit 31, or even failure of the pump, no fluid is released to the environment and no immediate operator or automatic action is required.

Figure 2:
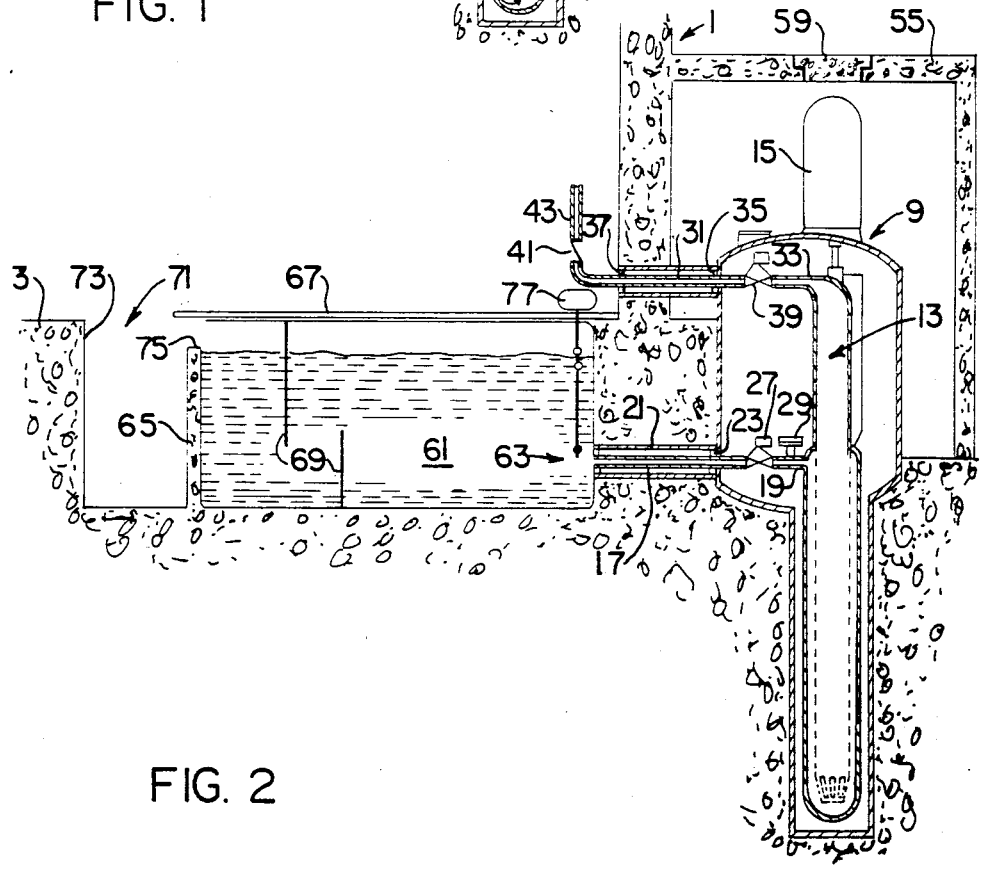
FIG. 2 is a view similar to FIG. 1 of another embodiment wherein the emergency water storage tank is positioned within the containment vessel.

In the embodiment illustrated in FIG. 2, the source of refueling and emergency coolant water is situated within the containment vessel 1. As illustrated, the pump 13 is contained within the enclosure 9, as are the inlet conduit 17, with valve 27 and rupture disc 29, and the exhaust conduit 31 with valve 39. The metallic enclosure 9, is shown to be encased within a concrete or other outer covering 55, with the motor 15 for the pump 13 being located outside the enclosure 9 and a seal 57 provided. The outer covering 55 may have manholes 59 for access to the pump motor 15. A source of water 61 is provided within the containment vessel 1, with the inlet conduit 17 communicating with the source of water, as at 63. The water is contained between a barrier 65 in the containment vessel, below the floor level of the containment vessel, and a cover 67 may be provided over the water. Baffles 69 are used to control the flow of water and to settle out solids, if present. A sump 71, is formed by the barrier 65 and recess 73 in the floor of the containment vessel. The upper wall 75 of the barrier 65 is below the floor 3 of the containment vessel 1, as illustrated. A liquid level indicator 77 may be used to monitor the level of the water 61.

This embodiment of the invention operates in the manner of the embodiment of FIG. 1, except that the source of emergency coolant water is the water 61 positioned within the containment vessel 1. As flooding water is poured into the reactor in the containment vessel 1, in the event of a loss of coolant situation, the flooded water will drain into sump 71 and when the level thereof reaches the top 75 of barrier 65, the water will flow past baffles 69 and will be recirculated through inlet conduit 17, pump 13 and outlet conduit 31 to a heat exchanger located within the containment vessel and will be reused for further cooling of the reactor core.

Figure 3:
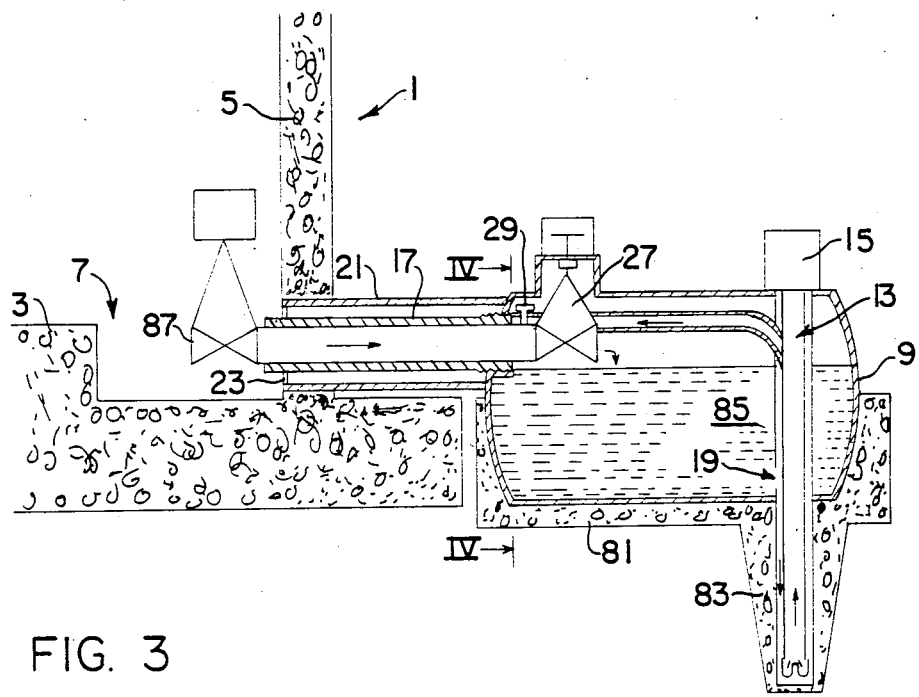
FIG. 3 is a cross-sectional, schematic illustration of a further embodiment wherein the emergency water storage tank is positioned within the enclosure.
Figures 4, 7:
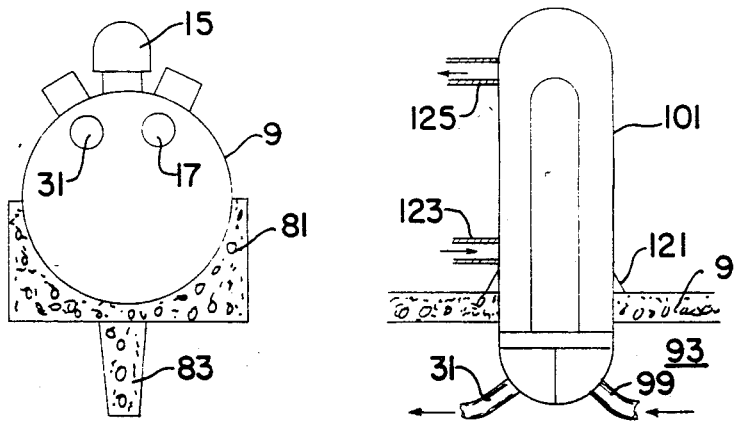
FIG. 4 is a view taken along line IV—IV of FIG. 3.
FIG. 7 is a schematic view of the heat exchanger 101 illustrated in FIG. 5.

In the embodiment illustrated in FIGS. 3 and 4, the enclosure also serves as a storage tank for the refueling and emergency water. As illustrated, the enclosure 9 is in the form of a horizontally disposed cylindrical metal enclosure which rests on a concrete or other pad 81, the pad 81 having a depending vertical section 83 which contains the lower portion of pump 13. The enclosure 9 is of a size such that the enclosure can serve as a reservoir for the emergency and refueling water 85. Inlet conduit 17 has a rupture disc 29 and valve 27 within the enclosure 9, and exhaust conduit 31 has a valve 39 within the enclosure. Flooded water from sump 7 within the containment vessel 1 is moved into the enclosure and fed back to a heat exchanger in the containment vessel 1. The pump 13, rather than having a direct connection within inlet conduit 17, has an inlet 19 below the surface of the stored water 85, and the inlet conduit 17 charges flooded water through valve 27 into the enclosure at a location spaced from the inlet 19 of the pump 13. A further valve 87 is provided, with the containment vessel 1, on the inlet conduit 17, to serve as a back-up shut-off valve in the event that the valve 27 within the enclosure 9 should fail.

Figure 5:
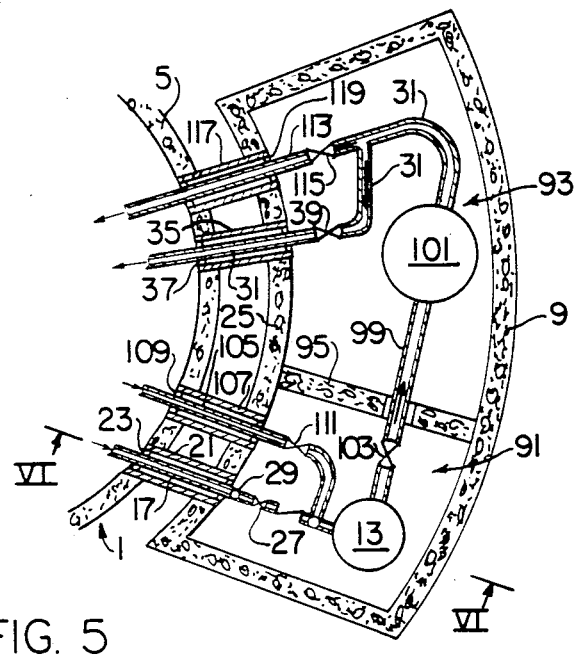
FIG. 5 is a schematic plan view of another embodiment wherein the heat exchanger for the recirculating emergency coolant is partially positioned within the enclosure.
Figure 6:
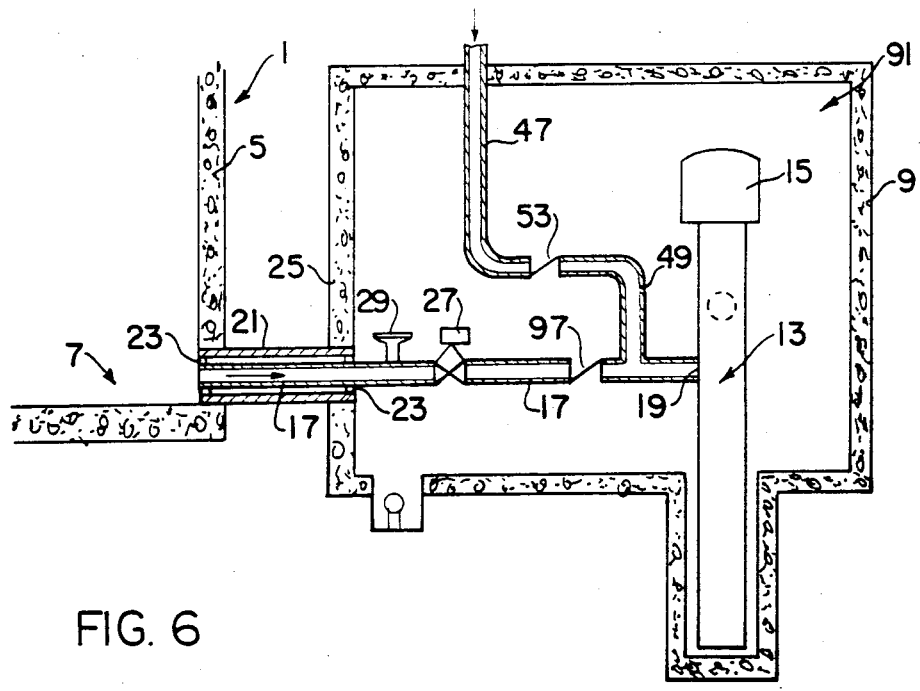
FIG. 6 is a view taken along line VI—VI of FIG. 5.

Another embodiment of the present invention is illustrated in FIGS. 5 and 6, wherein the enclosure 9, in addition to containing the pump and circulation conduits also contains a heat exchange unit. The enclosure 9, as shown, is divided into two sections, 91 and 93 by a dividing wall 95. Flooded water is directed from the sump 7 of the containment vessel 1, through inlet conduit 17, enclosed within outer casing 21, through valve 27 to the pump 13, shown as a vertical-type pump but which could be a horizontal-type pump, in section 91 of enclosure 9. Inlet conduit 17 also contains a rupture disc 29 and a check valve 97. The pump 13, by means of motor 15, then directs the water through connecting conduit 99, which passes through dividing wall 95, to a heat exchange unit 101, with the recirculation piping contained within section 93 of the enclosure 9. Connecting conduit 99 contains a valve 103, to enable shut-off of flow through that conduit if desired. From the heat exchanger 101, where the recirculating water is cooled, the water is directed through exhaust conduit 31, containing valve 39, the conduit 31 encased with outer casing 35 between the interior of the second section 93 of enclosure 9 and the interior of the containment vessel 1. The source of emergency coolant water is indicated as being outside the enclosure 9, but could also be within the containment vessel, with flow of such water made through line 47 and valve 53 to the inlet 49 which feeds into the inlet 19 of the pump 13.

In this embodiment, provision is also made for the use of the pump 13 and heat exchanger 101 within the enclosure 9 to cool and circulate cooling water during a normal cool down or refueling of the reactor core. Residual heat removal inlet conduit 105 passes through wall 5 of the containment vessel 1 and the wall 25 of the enclosure 9, the residual heat removal inlet conduit being encased within an outer casing 107, having sealing flanges 109. The residual heat removal inlet conduit 105 has a valve 111 therein and communicates with inlet conduit 17 within the first section 91 of the enclosure 9. Exhaust conduit 31, in the second section 93 of enclosure 9 has a residual heat removal exhaust conduit 113 communicating therewith, which contains a valve 115, and which is encased within an outer casing 117 having sealing flanges 119 between the interior of the enclosure 9 and the interior of the containment vessel 1.

As schematically illustrated in FIG. 7, the heat exchange unit 101 has the connecting conduit 99 and exhaust conduit 30 positioned within the enclosure 9, in section 93. Supporting and sealing means 121 seal the connection between heat exchanger 101 and the top wall of enclosure 9. Secondary coolant water to indirectly remove heat from the circulating water that is cooled in heat exchanger 101 and passed through exhaust line 31, enters through line 123 and exits through line 125.

The use of the residual heat removal system described is as follows. When the reactor core is to be cooled, below temperature achieved by the secondary cooling system, for example on a routine shut-down or for refueling, the water from the reactor core is fed to residual heat exchange inlet conduit 105. The water then flows through valve 11 into the inlet conduit 17 to the pump 13 and through inlet 19 to the pump. The pump 13 directs the water through connecting conduit 99 and valve 103 to the heat exchange unit 101. The water, after cooling in heat exchange unit 101 is directed through exhaust conduit 31. With valve 39 closed and valve 115 in open position, the cooled residual heat removal water is directed through residual heat removal exhaust conduit 113 and back to the reactor core for further recirculation. The above arrangement permits the emergency coolant system and residual heat removal system to both be contained with enclosure 9 and sealed to the atmosphere.

What is claimed is:

1. In a pressurized water reactor system of a nuclear power plant having a water storage tank for providing emergency coolant water and means provided external to the containment vessel, for use in the event of a primary loss of coolant situation, to circulate emergency water as a coolant by withdrawal through a wall of the containment vessel and return the same back through the wall of the containment vessel and passing the water through a heat exchange means prior to use as a coolant for the reactor core, the improvement comprising:

an enclosure, the interior of which is sealed to the atmosphere, positioned adjacent to and exterior of a wall of the containment vessel;

an inlet conduit, enclosed within a sealed outer casing, communicating between the interior of the containment vessel and the interior of the enclosure;

an exhaust conduit, enclosed within a sealed outer casing, communicating between the interior of the enclosure and the interior of the containment vessel;

a rupture disc on said inlet conduit within said enclosure, such that failure of the exhaust conduit within the enclosure will produce an increase of the pressure within the enclosure and above a predetermined pressure will fracture said rupture disc, and will circulate said coolant within said enclosure; and means within the interior of said enclosure for pumping coolant from the interior of the containment vessel through said inlet conduit, and back to the interior of the containment vessel through the exhaust conduit; whereby if either of said conduits should fail, coolant will be collected within the enclosure and sealed to the atmosphere.

2. In a pressurized water reactor system as defined in claim 1, the improvement wherein said heat exchange means is positioned within said enclosure.

3. In a pressurized water reactor system as defined in claim 1, the improvement wherein said heat exchange means is positioned within said containment vessel.

4. In a pressurized water reactor system as defined in claim 1, the improvement wherein said water storage tank is positioned outside said containment vessel.

5. In a pressurized water reactor system as defined in claim 4, the improvement wherein said enclosure serves as the emergency water storage tank.

6. In a pressurized water reactor system as defined in claim 1, the improvement wherein said water storage tank is positioned within said containment vessel.

7. In a pressurized water reactor system as defined in claim 1, the improvement wherein said means for pumping coolant and motor means for operating said means for pumping are contained within said enclosure.

8. In a pressurized water reactor system as defined in claim 1, the improvement wherein said enclosure is formed of a first section containing said pump, with said inlet conduit communicating with the interior of the containment vessel and said pump; and a second section, a heat exchanger in said second section, a connecting conduit between said pump and said heat exchanger, and the exhaust conduit communicating between the heat exchanger in said second section and the interior of said containment vessel.

9. In a pressurized water reactor system as defined in claim 8, the improvement wherein a residual heat removal inlet conduit is provided which communicates with the interior of said containment vessel and the inlet conduit, at a location within said first section, and a residual heat removal exhaust conduit is provided which communicates with said exhaust conduit, at a location within said second section, and the interior of said containment vessel.

10. In a pressurized water reactor system of a nuclear power plant having a water storage tank for providing emergency coolant water and means provided external to the containment vessel, for use in the event of a primary loss-of-coolant situation, to circulate emergency water as a coolant by withdrawal through a wall of the containment vessel and return the same back through the wall of the containment vessel and passing the water through a heat exchange means prior to use as a coolant for the reactor core, the improvement comprising:
an enclosure, the interior of which is sealed to the atmosphere, positioned adjacent to and exterior of a wall of the containment vessel;
an inlet conduit, enclosed within a sealed outer casing, communicating between the interior of the containment vessel and the interior of the enclosure, said inlet conduit, at a location within said enclosure, containing a rupture disc and a valve;
an exhaust conduit, enclosed within a sealed outer casing, communicating between the interior of the enclosure and the interior of the containment vessel, said exhaust conduit, at a location within said enclosure, containing a valve such that failure of the exhaust conduit within the enclosure will produce an increase of the pressure within the enclosure, and above a predetermined pressure will fracture said rupture disc of said inlet conduit, and will circulate of said coolant within said enclosure; and
means within the interior of said enclosure for pumping coolant from the interior of the containment vessel through the inlet conduit, and back to the interior of the containment vessel through the exhaust conduit, comprising a pump and a motor therefor; whereby if either of said conduits or said pump should fail, coolant will be collected within the enclosure and sealed to the atmosphere.

11. In a pressurized water reactor system as defined in claim 10, the improvement wherein said water storage tank is positioned outside the containment vessel and the enclosure, and having a conduit leading from the storage tank to the pump, and valve means in said conduit for controlling the flow of emergency coolant water therethrough.

12. In a pressurized water reactor system as defined in claim 10, the improvement wherein said water storage tank is positioned within the containment vessel and a sump is provided in the containment vessel adjacent said tank, with means provided to direct overflow emergency coolant water from said sump to said water storage tank.

13. In a pressurized water reactor system as defined in claim 10, the improvement wherein said enclosure serves as the emergency water storage tank.

14. In a pressurized water reactor system as defined in claim 10, the improvement wherein said enclosure is formed of a first section containing said pump with said inlet conduit communicating with the interior of the containment vessel and said pump; and a second section, a heat exchanger in said second section, a connecting conduit between said pump and said heat exchanger, and the exhaust conduit communicating between the heat exchanger in said second section and the interior of said containment vessel.

15. In a pressurized water reactor system as defined in claim 14, the improvement wherein a residual heat removal inlet conduit is provided which communicates with the interior of said containment vessel and the inlet conduit, at a location within said first section, and a residual heat removal exhaust conduit is provided which communicates with said exhaust conduit, at a location within said second section, and the interior of said containment vessel.

* * * * *